(12) United States Patent  
Kreh (10) Patent No.: US 6,875,972 B2
(45) Date of Patent: Apr. 5, 2005

(54) AUTOFOCUS MODULE FOR MICROSCOPE-BASED SYSTEMS

(75) Inventor: Albert Kreh, Solms (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 10/625,427

(22) Filed: Jul. 23, 2003

(65) Prior Publication Data

US 2004/0124334 A1 Jul. 1, 2004

(30) Foreign Application Priority Data

Jul. 30, 2002 (DE) ......................................... 102 34 756

(51) Int. Cl.[7] ................................................. G01J 1/20
(52) U.S. Cl. ................................. 250/201.3; 250/201.4
(58) Field of Search .......................... 250/201.2, 201.3, 250/201.4, 201.5, 201.7, 201.8; 356/601, 609; 359/368, 381, 385

(56) References Cited

U.S. PATENT DOCUMENTS 4,079,248 A  *  3/1978  Lehureau et al. ......... 250/201.3
4,595,829 A       6/1986  Neumann et al. ......... 250/201.4
5,270,527 A      12/1993  Salzmann ................ 250/201.3

FOREIGN PATENT DOCUMENTS

| DE | 32 19 503 C2 | 12/1983 | ............ G02B/7/11 |
| DE | 41 33 788 A1 | 4/1993  | ............ G02B/7/36 |
| EP | 0 124 241 B1 | 11/1988 | ......... G02B/21/100 |

* cited by examiner

Primary Examiner—Kevin Pyo
(74) Attorney, Agent, or Firm—Houston Eliseeva LLP (57) ABSTRACT

The autofocus module possesses, between the detector element (43) and the optical means, a cylindrical lens (42) that, for determination of the focus position, generates a line on the detector element (43). In addition, the detector element (43) is pivotable about an axis in such a way that it is inclined with respect to a plane defined by the surface of the specimen (20), and its inclination is adjustable. All the optical components of the autofocus module are combined in a housing (25) that can be quickly flange-mounted onto an existing microscope-based system (1).

30 Claims, 7 Drawing Sheets

AUTOFOCUS MODULE FOR MICROSCOPE-BASED SYSTEMS

CROSS REFERENCE TO RELATED APPLICATIONS

This application claims priority of the German patent application 102 34 756.5 which is incorporated by reference herein.

FIELD OF THE INVENTION

The invention concerns an autofocus module for a microscope-based system. The invention concerns in particular an autofocus module for a microscope-based system having an objective that defines an image beam path which is perpendicular to a surface of a specimen and can be focused thereonto, and having an illumination beam path that encompasses a light source for illumination of the specimen.

BACKGROUND OF THE INVENTION

German Patent DE 32 19 503 discloses an apparatus for automatic focusing onto specimens to be viewed in optical devices. After reflection at the surface of a specimen, the reflected measurement light beam bundle passes through a pinhole after reflection at a splitter mirror. A portion of the measurement light beam bundle is reflected out by means of a fully mirror-coated surface, and after passing through a slit aperture is directed onto a differential diode. In the focused state, the focus is located between the two diodes. In the event of defocusing, the measurement spot drifts onto one of the two diodes, which are connected to corresponding control means. The control means adjust optical or mechanical means of the microscope in order to bring the measurement spot back between the two diodes, and thus reestablish the focus position.

European Patent Application EP-A-0 124 241 discloses a microscope having an automatic focusing device. The microscope encompasses a memory device for saving the data from the objectives that are used in the microscope. Also provided is a control device which monitors and regulates the various microscope functions. Another of the tasks of the control device is to move the focusing stage. A CCD element, which receives an image from the particular selected objective and, together with a computation unit, determines the image sharpness based on optimum contrast, is provided as the image acquisition device. The objective data of the objective presently in use must be taken into account when determining the optimum sharpness. Those data are, as mentioned above, stored in a memory.

German Unexamined Application DE 41 33 788 furthermore discloses a method for autofocusing of microscopes, and an autofocus system for microscopes. The image of a specimen or of a pattern reflected onto the specimen is conveyed to two areas on a detector or to two different detectors; in the focused position, one image is produced in front of one detector, and one image behind the other detector. The image sharpness states on the detectors are converted into electronic signals, whose difference is used to focus the objective. The distances of the image or of the respective pattern from the respective detectors are adjustable. Deliberate offset settings, as well as "IR offset" correction settings, can be implemented.

A problem in the context of automatic focusing in microscopes, for the examination of specimens having several focal planes, is that the autofocus system does not know which plane it should sharply focus onto. The autofocus system can focus onto only one of the planes, and it can easily happen that the autofocus system loses the focal plane and jumps to another as it corrects. The multiple planes result, for example in the semiconductor industry, in the context of different topological steps or multiple photoresist layers. In conventional microscopy and in confocal microscopy, there are also multiple layers that can be focused on. In samples equipped with coverslips, these can be the upper side of the coverslip with the interface to air, or the underside of the coverslip with the interface to the sample.

SUMMARY OF THE INVENTION

It is accordingly the object of the present invention to create an autofocus module for a microscope-based system with which multiple focal planes can be detected at one time. In addition, it is possible ultimately to focus on a selected focal plane.

The object is achieved by way of an autofocus module for a microscope-based system comprising:

- an objective that defines an image beam path which is perpendicular to a surface of a specimen
- an illumination beam path that encompasses a light source for illumination of the specimen,
- a light source for generating a measurement light bundle for determining a focus position;
- an optical means for splitting the measurement light bundle in such a way that an eccentrically extending measurement light beam bundle is created;
- a first dichroic beam splitter is provided in the image beam path of the microscope-based system, which couples the measurement light beam bundle eccentrically into the microscope-based system and directs it onto the surface of the specimen;
- the optical means directs onto a detector element a measurement light beam bundle remitted from the microscope-based system; and
- a cylindrical lens between the detector element and the optical means.

The autofocus module has the particular advantage that there is provided between the detector element and the optical means a cylindrical lens that, for determination of the focus position, generates a line that is imaged onto the detector element. In addition, means are provided which pivot the detector element about an axis, so that the detector element is inclined with respect to a plane defined by the surface of the specimen, and its inclination is adjustable.

Furthermore, the detector element can be pivoted or adjusted exclusively and only about an axis that is parallel to the X axis of a coordinate system. The optical components of the autofocus module are combined in a housing. The optical elements in the module are thereby pre-aligned, and it can be quickly attached to an existing microscope-based system. The detector element can be embodied as a two-dimensional area sensor or constituted by at least two linear sensors arranged parallel to one another. A laser light source that emits IR light as the measurement light is used in the autofocus module as the light source. This is advantageous because the specimen is not influenced thereby. A computer or a control system are connected to the microscope-based system and the module, serving to control the detector element in the module and the microscope-based system. Control is of the inclination of the detector element is important because means are provided which perform an adjustment of the inclination of the detector element. In addition, the inclination of the detector element can be modified during measurement; this results in a change in the sensitivity of the measurements performed.

BRIEF DESCRIPTION OF THE DRAWINGS

Further advantages and advantageous embodiments are the subject matter of the description below of the Figures, in whose presentation accurately scaled reproduction was dispensed with in favor of clarity. In the individual drawings.

DETAILED DESCRIPTION OF THE INVENTION

Figure 1:
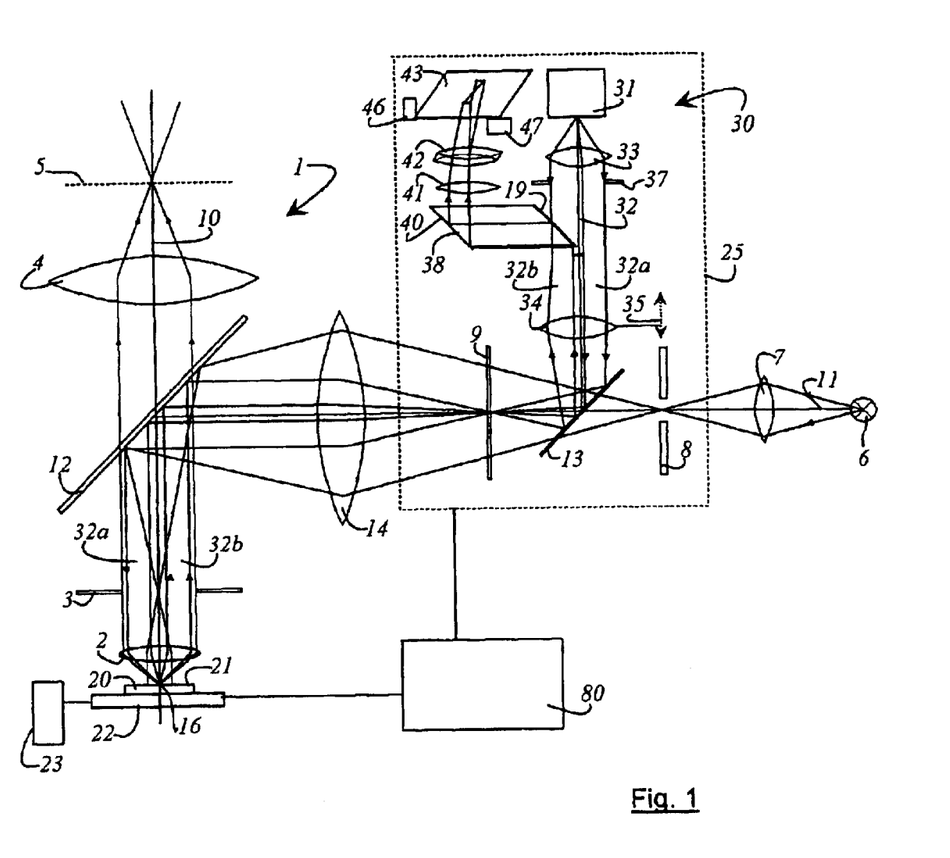
FIG. 1 is a partial side view of the beam paths of an optical device or a microscope-based-system to which an autofocus module is attached.

FIG. 1 depicts a vertically extending image beam path 10 of a microscope-based system 1. Microscope-based system 1 comprises a light source 6 which emits light into illumination beam path 11. Microscope-based system 1 serves to illuminate a specimen 20 which defines a surface 21 that is located in the focal plane of microscope-based system 1. The light of illumination beam path 11 first passes through an objective 2 and strikes surface 21 of specimen 20. A certain portion of the light is reflected from surface 21 of specimen 20 and passes first through an objective pupil 3. The beam reflected from surface 21 of specimen 20 passes, in image beam path 10, through a dichroic splitter mirror 12 that has a 50:50 ratio in the visible region and high reflectivity in the IR. The light of the image beam path then traverses a tube lens 4, and an image of specimen 20 is generated in intermediate image plane 5. The light in image beam path 10 then travels to an eyepiece (not depicted).

In the situation depicted, illumination beam path 11 of the microscope-based system extends horizontally. Light of illumination beam path 11 emerges from a light source 6. After leaving an optical system 7, the light passes through an aperture stop 8 in whose plane is arranged a pinhole slider (not depicted) that contains at least two pinholes of differing dimensions. With this pinhole slider, an aperture stop 8 adapted to the measurement with the microscope-based system can be inserted, in manual or motorized fashion, with position response.

The light of illumination beam path 11 then passes through a second dichroic beam splitter 13 which has the greatest possible transmissivity for the visible light coming from light source 6, and the greatest possible reflectivity for IR light. A mark whose function is explained below is located in the plane of field diaphragm 9. After passage through a lens 14, the light of illumination beam path 11 strikes first dichroic beam splitter 12, from which the reflected portions are deflected toward specimen 20.

A laser autofocus system, which in the exemplary embodiment depicted here is combined with all the necessary optical components into a module 30, is provided for adjusting the focus. Module 30 is surrounded by a housing 25 that is depicted symbolically in FIG. 1 as a dashed-line box. Module 30 can be inserted, for example, into an existing optical illumination system such as the one described for incident-light microscopes e.g. in German Utility Model 79 17 232, snap-lock means known per se ensuring accurately aligned positioning of module 30 in illumination beam path 11.

A (preferably pulsed) laser light proceeds from a laser light source 31 that, in the embodiment depicted, is embodied as a laser diode. Advantageously, IR light is used as the measurement light, since it does not have a disruptive influence on the microscopic image of specimen 20. A measurement light bundle 32 is directed, via a stationary lens 33 and then via a lens 34 that can be displaced in manual or motorized fashion in the axial direction as defined by dashed double arrow 35, onto second dichroic splitter mirror 13, which is arranged at the optical interface of the beam paths of measurement light bundle 32 and illumination beam path 11. An image of laser light source 31 is generated in the intermediate image plane in which field diaphragm 9 is positioned.

Laser light source 31 is imaged onto surface 21 of specimen 20 in a measurement spot 16. One half of a pupil 37 is covered so that in the event of defocusing, measurement spot 16 drifts on surface 21 of specimen 20. The geometric covering of one half of measurement light bundle 32 is achieved using a combined optical component, for example a deflection prism 38, which is inserted halfway into measurement light bundle 32 at the level of pupil 37. Deflection prism 38 contains a fully mirror-coated prism surface 19. The portion of measurement light bundle 32 that is not prevented from propagating by the arrangement of deflection prism 38 is labeled in FIG. 1 with the reference character 32a. With eccentrically extending measurement light bundle 32a of illumination-side measurement light bundle 32, eccentrically extending portion 32a therefore proceeds into objective pupil 3 (substantially) parallel to image beam path 10 of microscope-based system 11.

After reflection at surface 21 of specimen 20, remitted measurement light beam bundle 32b passes lens 14, and after reflection at second dichroic splitter mirror 13, the light of remitted measurement light bundle 32b strikes fully mirror-coated prism surface 19 of deflection 38. Remitted measurement light beam bundle 32 is then reflected out by fully mirror-coated prism surface 19 of deflection prism 38. After total reflection at a prism surface 40, and after passing through optical system 41, the beam is widened by a downstream cylindrical lens 42 before striking a detector element 43. Detector element 43 can be embodied as a two-dimensional area sensor, e.g. as a CCD or CMOS sensor. Detector element 43 can be tilted. Provided for that purpose are displacement means 46 and 47, which incline detector element 43 with respect to a plane defined by the surface of specimen 20. The plane thus defined by inclined detector element 43 is oblique (not perpendicular) with respect to the incident remitted measurement light beam bundle 32b, so that in the focused state, remitted measurement light beam bundle 32b is imaged sharply only at the center. A computer 80 or a control system are connected to microscope-based system 1 and to module 30. Computer 80 serves to control detector element 43 in the module and microscope-based system 1, and to acquire corresponding data, and also to perform the displacement or tilting of detector element 43. Adjustment of the focus can also be performed by computer 80 via a motor 23 which actuates the Z drive of a microscope stage 22. Motor 23 receives from computer 80 the correspondingly processed signals from detector element 43. These signals serve for control purposes and to adjust the focus, and are conveyed to motor 23.

Figure 8A:
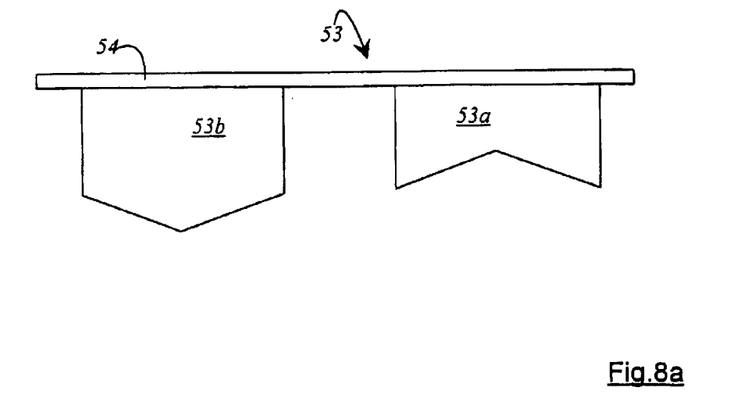
FIG. 8a shows an embodiment of a further optical element that additionally widens the measurement light beam bundle.
Figure 8B:
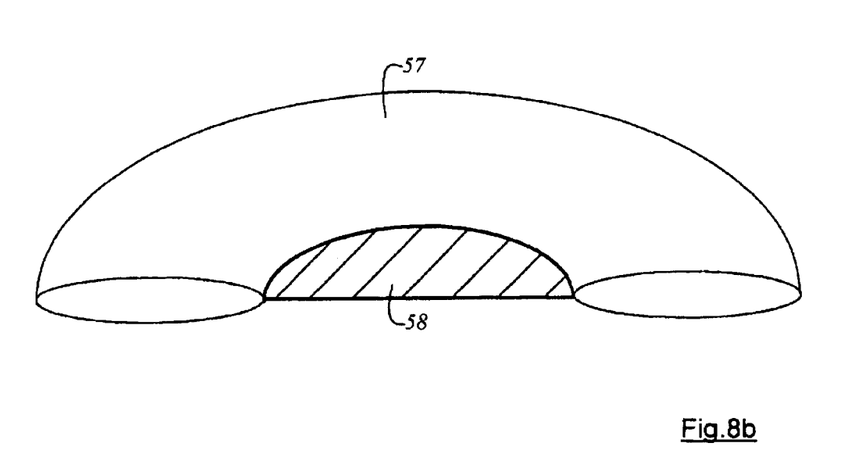
FIG. 8b shows an additional embodiment of a further optical element that additionally widens the measurement light beam bundle.

In order additionally to achieve a beam widening of measurement light beam bundle 32, a further optical element is provided, between deflection prism 38 and lens 34, which additionally widens measurement light beam bundle 32. As depicted in FIG. 8a, the optical element can be an axicon 53. A first and a second axicon 53a and 53b are mounted on a glass plate 54 as support. First axicon 53a acts on the eccentrically extending measurement light beam bundle 32a, and second axicon 53b acts on remitted measurement light beam bundle 32b. The exemplary embodiment of FIG. 8b shows a toroidal lens 57 as the optical element. Toroidal lens 57 is a lens element that is curved into a ring. The opening of the ring is equipped with an opaque stop 58. The effect of toroidal lens 57 is comparable to that of axicon 53.

Figure 2:
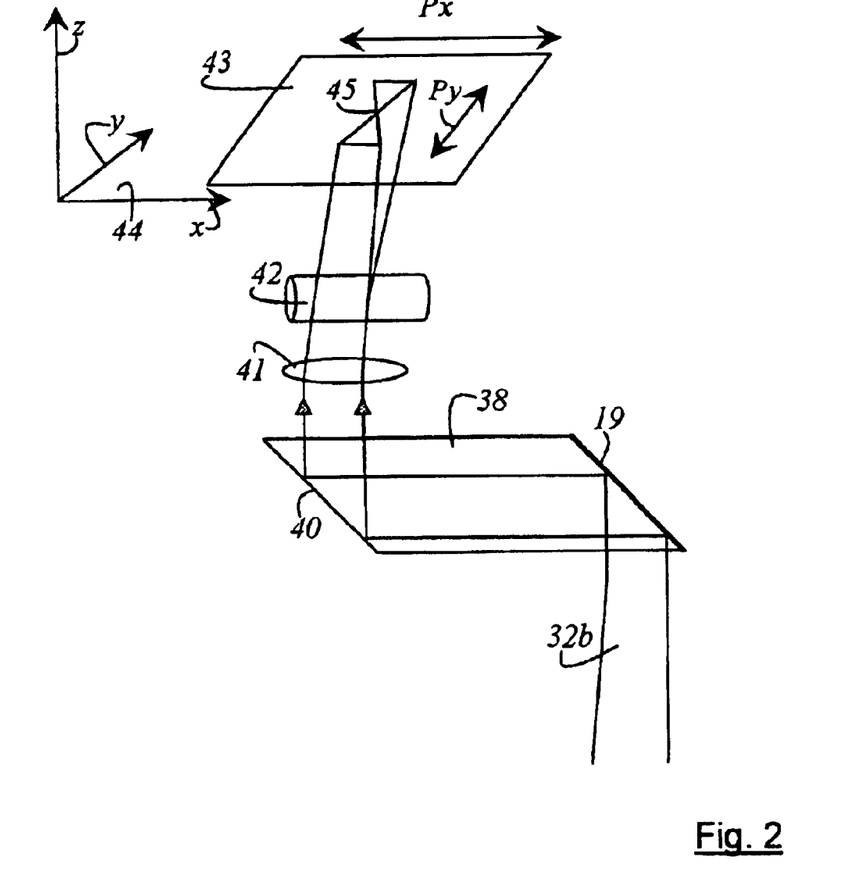
FIG. 2 is a detail view of the measurement light beam bundle striking the measurement sensor.

FIG. 2 is a detail view of measurement light beam bundle 32b striking detector element 43. Cylindrical lens 42 normally converts measurement light beam bundle 32b, at the focus, into a line (see FIG. 4). In the depiction in FIG. 2, detector element 43 is pivoted about an axis parallel to the X axis of the coordinate system. Plane 44 spanned by the X and Y coordinate axes is parallel to surface 21 of specimen 20. Tilting of detector 43 about the X axis causes the line (FIG. 4) to be imaged sharply at only one spot 45 (only one plane of sharpness present in specimen 20). When specimen 21 is displaced in the direction of the Z axis, measurement light beam bundle 32b shifts on detector element 43. The direction of the shift is indicated by double arrow Px. In contrast to a conventional laser autofocus system, the tilting of detector element 43 still produces a single spot on detector element 43 despite the change in the position of surface 21 of specimen 20, and in the defocused state the distance between surface 21 of specimen 20 and the focal plane can be ascertained by analyzing the position of spot 45 on detector element 43. If detector element 43 is tilted, with respect to the plane defined by the surface of the specimen, by an angle that is attainable by displacement of the detector element about the one axis parallel to the X axis and the one parallel to the Y axis. With a detector element 43 tilted in this fashion, measurement light beam bundle 32b extends along double arrow Px, and the spot or spots extend along a double arrow Py.

Figure 3:
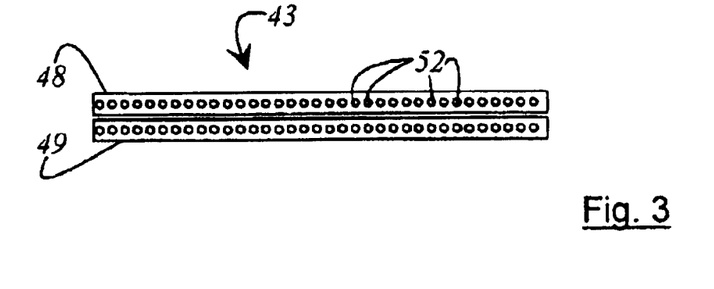
FIG. 3 shows a further embodiment of the detector element.

FIG. 3 shows a further embodiment of detector element 43. Detector element 43 comprises at least two linear sensors 48 and 49 arranged parallel to one another. Each of the linear sensors comprises a plurality of linearly arranged photodiodes 52.

Figure 4:
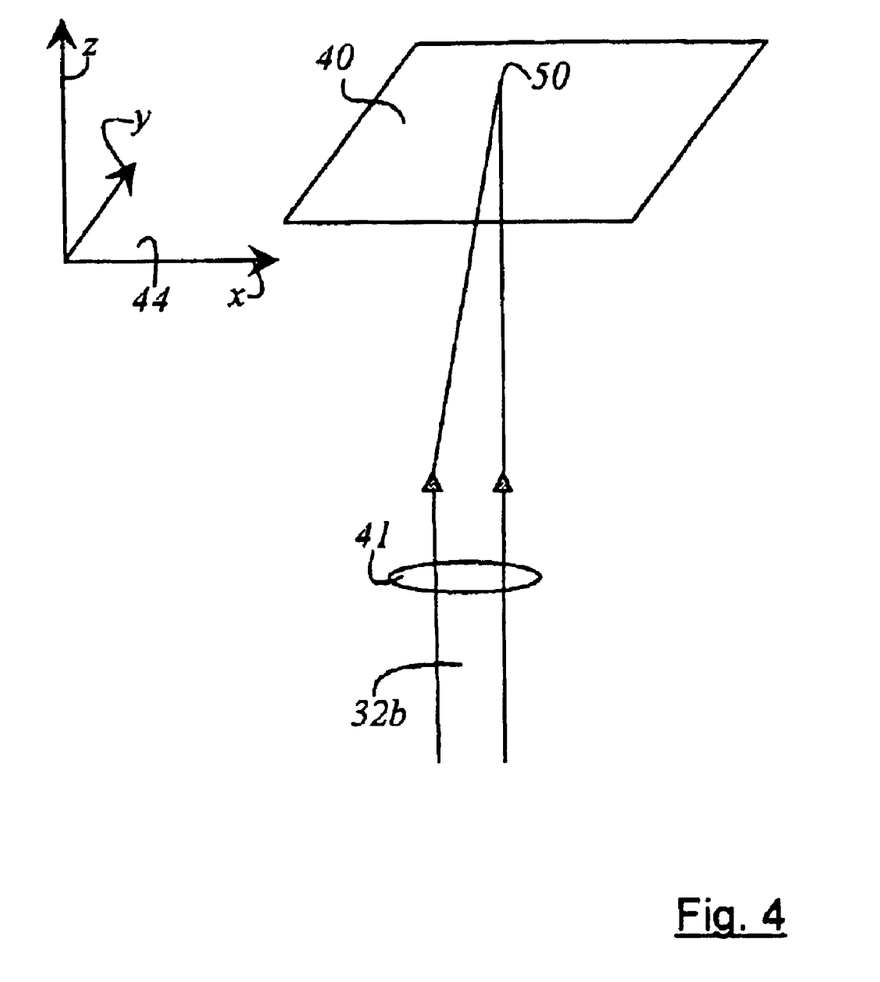
FIG. 4 shows the autofocus module in the focused state, the measurement beam being focused onto one spot.

FIG. 4 shows the laser autofocus system for microscope-based system 1 in the focused state. In this example, cylindrical lens 42 is omitted and detector element 43 is not tilted. Remitted measurement light beam bundle 32b is, in this case, focused onto a single spot 50 determined by optical system 41.

Figure 5:
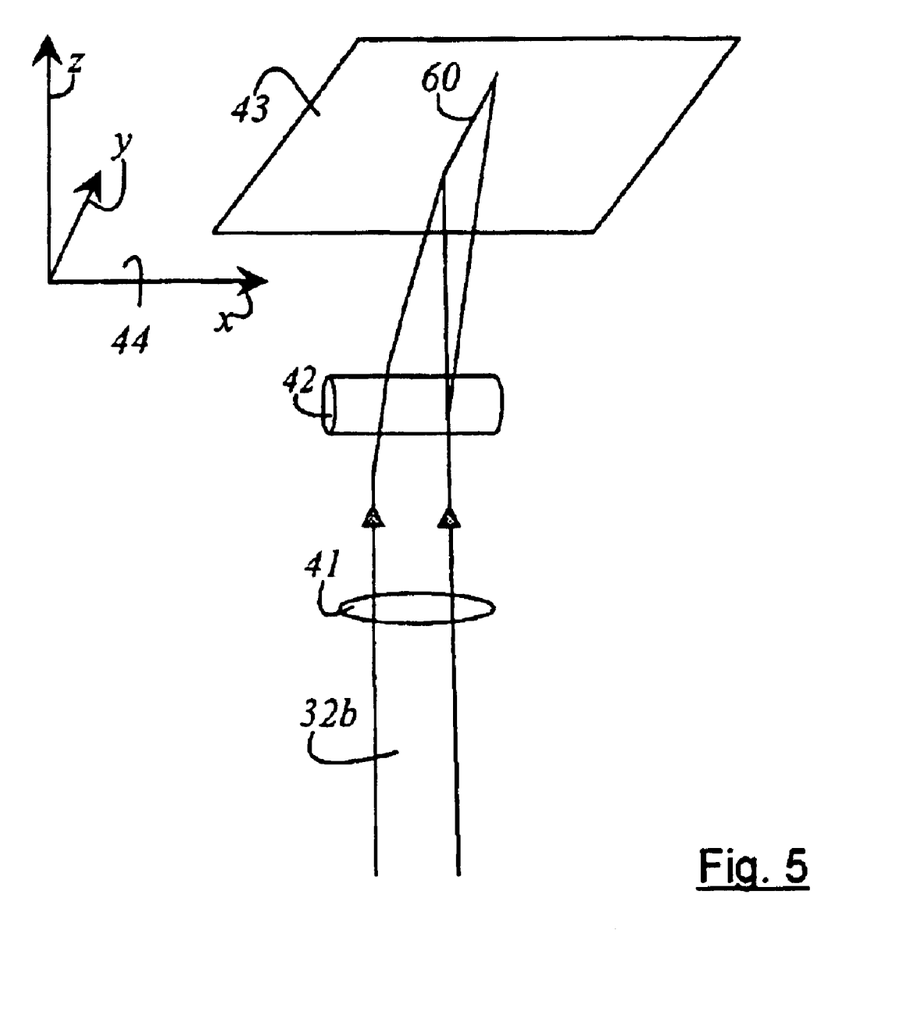
FIG. 5 shows the use of a cylindrical lens which generates, from the measurement spot, a sharp line that is imaged onto the detector element.

FIG. 5 shows the result when cylindrical lens 42 is added. Remitted measurement light bundle 32b is, in this case, focused onto a by optical system 41 and cylindrical lens 42 into a single sharp line 60. Note in this context that the plane defined by detector element 43 is parallel to plane 44 spanned by the X and Y coordinate axes. Plane 44 corresponds to surface 21 of specimen 20.

Figure 6:
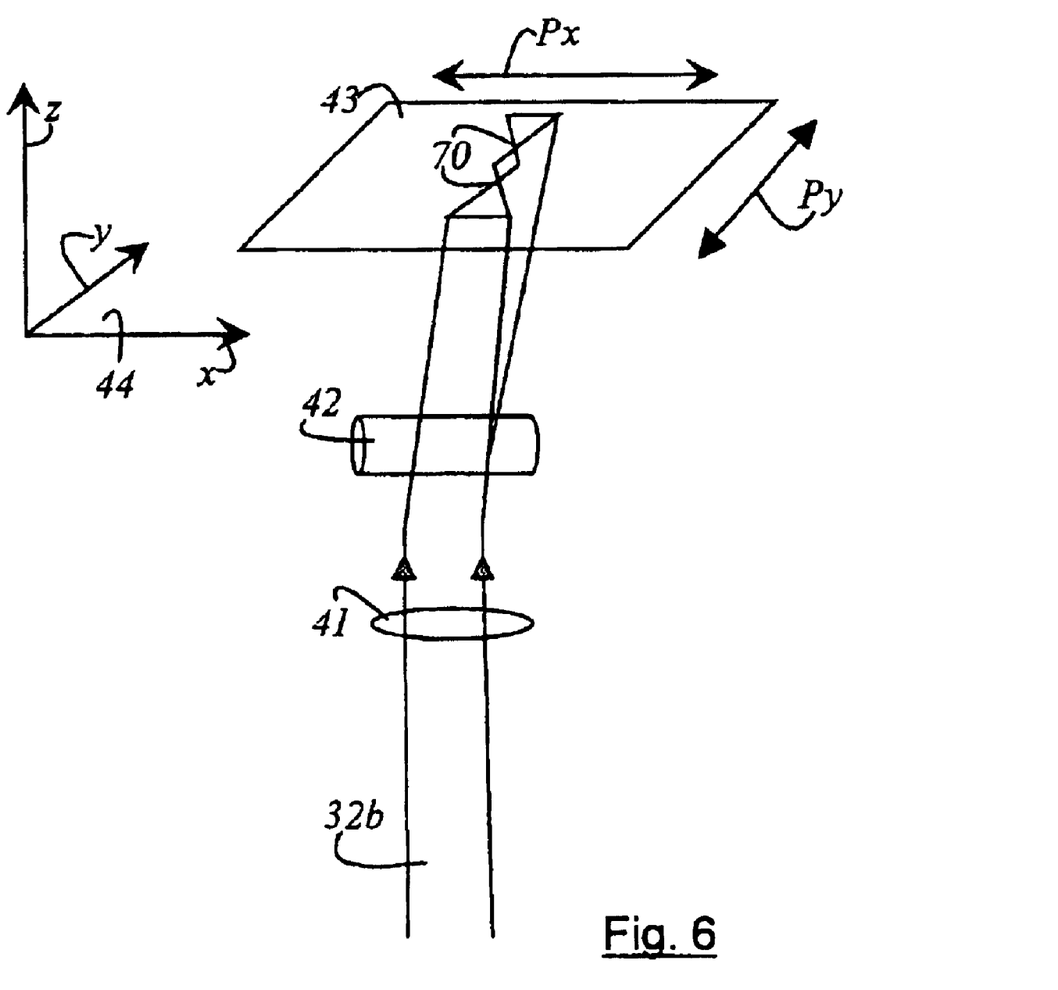
FIG. 6 shows that by tilting the detector element, the line is imaged sharply at multiple spots if multiple focal planes are present on the specimen.

FIG. 6 depicts the situation in which surface 21 of specimen 20 has a structure that displays a differing vertical profile (see FIGS. 7a and 7b) As already depicted in FIG. 2, measurement sensor 43 is pivoted about the axis parallel to the X axis of the coordinate system. Plane 44 spanned by the X and Y coordinate axes is parallel to surface 21 of specimen 20. In the present case, tilting of detector element 43 about the X axis yields several spots 70, of which each individual spot represents a specific surface on specimen 20. The capability thus exists for focusing onto multiple planes.

Figure 7A:
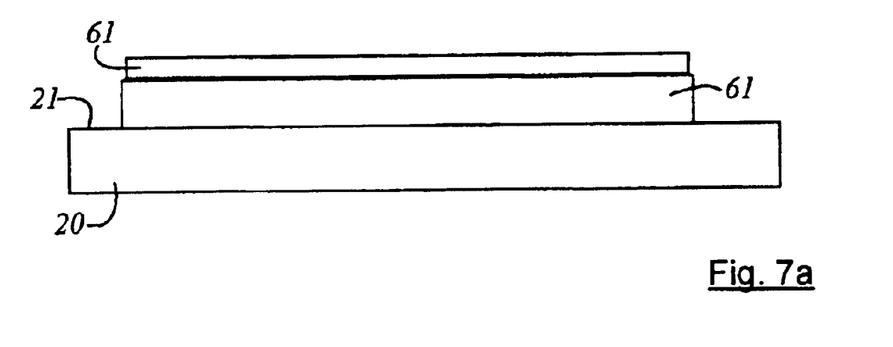
FIG. 7a shows one (or more) transparent films, one above another, which constitute the different focal planes.
Figure 7B:
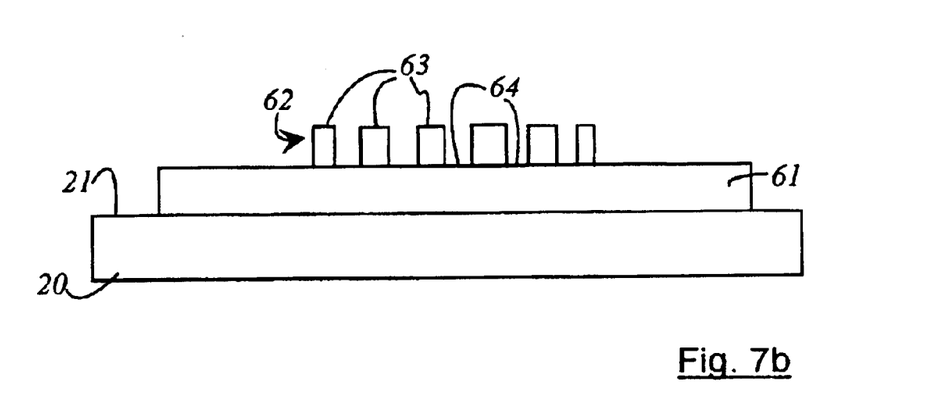
FIG. 7b shows a stepped structure on the specimen which is small compared to the measurement spot on the specimen.

FIGS. 7a and 7b depict two exemplary embodiments of the surface structure of a specimen 20. FIG. 7a depicts the situation in which one or more transparent films 61 are applied one above another onto surface 21 of specimen 20. The autofocus system can focus simultaneously onto the different films. In the example shown in FIG. 7b, a stepped structure 62, which itself can in turn be applied on a transparent film 61, is configured on surface 21 of specimen 20. Stepped structure 62 is small compared to the measurement spot on specimen 20. The result for the measurement spot is therefore on the one hand an optimum focus position on top surfaces 63 of stepped structure 62, and on the other hand a further optimum focus position for trenches 64 of stepped structure 62. Depending on the configuration of stepped structure 62 or the number of different films 61, several optimum focus positions are obtained that can be sharply focused onto. In the plurality of focus positions, each of these focus positions or planes generates a spot 70 on detector element 43. By analyzing the position of these spots 70 with respect to one another, it is possible to identify the various planes of the specimen and then bring the desired plane into focus.

The invention has been described with reference to a particular exemplary embodiment. It is self-evident, however, that changes and modifications can be made without thereby leaving the range of protection of the claims below.

What is claimed is:

1. An autofocus module for a microscope-based system, comprising:

an objective that defines an image beam path which is perpendicular to a surface of a specimen an illumination beam path that encompasses a light source for illumination of the specimen, a light source for generating a measurement light bundle for determining a focus position;

an optical means for splitting the measurement light bundle in such a way that an eccentrically extending measurement light beam bundle is created;

a first dichroic beam splitter is provided in the image beam path of the microscope-based system, which couples the measurement light beam bundle eccentrically into the microscope-based system and directs it onto the surface of the specimen;

the optical means directs onto a detector element a measurement light beam bundle remitted from the microscope-based system; and a cylindrical lens between the detector element and the optical means.

2. The autofocus module as defined in claim 1, wherein the optical means is embodied as a prism that has one fully mirror-coated prism surface and one prism surface for total reflection, the mirror-coated prism surface generating, from the measured light bundle, an eccentrically extending measurement light beam bundle.

3. The autofocus module as defined in claim 1, wherein the detector element is a two-dimensional area sensor.

4. The autofocus module as defined in claim 1, wherein the detector element comprises at least two linear sensors arranged parallel to one another.

5. The autofocus module as defined in claim 1, wherein the light source, the detector element, the optical means, the cylindrical lens, the stationary lens and a displaceable lens, a second dichroic beam splitter, and the displacement means are arranged in a housing.

6. The autofocus module as defined in claim 5, wherein the lens is displaceable in manual or motorized fashion in the direction of a dashed double arrow.

7. The autofocus module as defined in claim 5, wherein housing can be attached to the microscope-based system.

8. The autofocus module as defined in claim 1, wherein the light source is a laser light source.

9. The autofocus module as defined in claim 8, wherein the laser light source emits IR light as the measurement light.

10. The autofocus module as defined in claim 1, wherein the microscope-based system and the autofocus module are connected to a computer.

11. An autofocus module for a microscope-based system, comprising:

an objective that defines an image beam path which is perpendicular to a surface of a specimen an illumination beam path that encompasses a light source for illumination of the specimen, a light source for generating a measurement light bundle for determining a focus position;

an optical means for splitting the measurement light bundle in such a way that an eccentrically extending measurement light beam bundle is created;

a first dichroic beam splitter is provided in the image beam path of the microscope-based system, which couples the measurement light beam bundle eccentrically into the microscope-based system and directs it onto the surface of the specimen;

the optical means directs onto a detector element a measurement light beam bundle remitted from the microscope-based system, wherein displacement means are provided which incline the detector element with respect to a plane defined by the surface of the specimen; and a cylindrical lens between the detector element and the optical means.

12. The autofocus module as defined in claim 11, wherein the optical means is embodied as a prism that has one fully mirror-coated prism surface and one prism surface for total reflection, the mirror-coated prism surface generating, from the measured light bundle, an eccentrically extending measurement light beam bundle.

13. The autofocus module as defined in claim 11, wherein the detector element is a two-dimensional area sensor.

14. The autofocus module as defined in claim 11, wherein the detector element comprises at least two linear sensors arranged parallel to one another.

15. The autofocus module as defined in claim 11, wherein the light source, the detector element, the optical means, the cylindrical lens, the stationary lens and a displaceable lens, a second dichroic beam splitter, and the displacement means are arranged in a housing.

16. The autofocus module as defined in claim 15, wherein the lens is displaceable in manual or motorized fashion in the direction of a dashed double arrow.

17. The autofocus module as defined in claim 15, wherein housing can be attached to the microscope-based system.

18. The autofocus module as defined in claim 11, wherein the light source is a laser light source.

19. The autofocus module as defined in claim 18, wherein the laser light source emits IR light as the measurement light.

20. The autofocus module as defined in claim 11, wherein the microscope-based system and the autofocus module are connected to a computer.

21. An autofocus module for a microscope-based system, comprising:

an objective that defines an image beam path which is perpendicular to a surface of a specimen an illumination beam path that encompasses a light source for illumination of the specimen, a light source for generating a measurement light bundle for determining a focus position;

an optical means for splitting the measurement light bundle in such a way that an eccentrically extending measurement light beam bundle is created;

a first dichroic beam splitter is provided in the image beam path of the microscope-based system, which couples the measurement light beam bundle eccentrically into the microscope-based system and directs it onto the surface of the specimen;

the optical means directs onto a detector element a measurement light beam bundle remitted from the microscope-based system, wherein a displacement means is provided which inclines the detector element exclusively about an axis that is parallel to the X axis of a Cartesian coordinate system; and a cylindrical lens between the detector element and the optical means.

22. The autofocus module as defined in claim 21, wherein the optical means is embodied as a prism that has one fully mirror-coated prism surface and one prism surface for total reflection, the mirror-coated prism surface generating, from the measured light bundle, an eccentrically extending measurement light beam bundle.

23. The autofocus module as defined in claim 21, wherein the detector element is a two-dimensional area sensor.

24. The autofocus module as defined in claim 21, wherein the detector element comprises at least two linear sensors arranged parallel to one another.

25. The autofocus module as defined in claim 1, wherein the light source, the detector element, the optical means, the cylindrical lens, the stationary lens and a displaceable lens, a second dichroic beam splitter, and the displacement means are arranged in a housing.

26. The autofocus module as defined in claim 25, wherein the lens is displaceable in manual or motorized fashion in the direction of a dashed double arrow.

27. The autofocus module as defined in claim 25, wherein housing can be attached to the microscope-based system.

28. The autofocus module as defined in claim 21, wherein the light source is a laser light source.

29. The autofocus module as defined in claim 28, wherein the laser light source emits IR light as the measurement light.

30. The autofocus module as defined in claim 21, wherein the microscope-based system and the autofocus module are connected to a computer.

* * * * *